(12) United States Patent
Hou et al.

(10) Patent No.: US 10,908,720 B2
(45) Date of Patent: Feb. 2, 2021

(54) DISPLAY DEVICE

(71) Applicant: Yungu (Gu'an) Technology Co., Ltd., Langfang (CN)

(72) Inventors: Hongqi Hou, Langfang (CN); Yuhua Wu, Langfang (CN); Fu Liao, Langfang (CN); Zhaoji Zhu, Langfang (CN); Kanglong Sun, Langfang (CN); Liuyang Wang, Langfang (CN); Liwei Ding, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/381,392

(22) Filed: Apr. 11, 2019

(65) Prior Publication Data
US 2019/0235683 A1    Aug. 1, 2019

Related U.S. Application Data

(63) Continuation-in-part of application No. PCT/CN2019/071585, filed on Jan. 14, 2019.

(30) Foreign Application Priority Data

May 21, 2018  (CN) .................... 2018 2 0768028 U

(51) Int. Cl.
*G06F 3/041*  (2006.01)
*G06F 1/16*  (2006.01)
*G06F 3/0488*  (2013.01)

(52) U.S. Cl.
CPC .......... *G06F 3/0412* (2013.01); *G06F 1/1652* (2013.01); *G06F 3/041* (2013.01); *G06F 3/0416* (2013.01); *G06F 3/0488* (2013.01); *G06F 3/04162* (2019.05); *G06F 2203/04102* (2013.01)

(58) Field of Classification Search
CPC combination set(s) only.
See application file for complete search history.

(56) References Cited

U.S. PATENT DOCUMENTS

2015/0091877 A1\* 4/2015 Kim ...................... G06F 3/0418
                                                                345/178
2019/0266374 A1\* 8/2019 Lee ..................... G06F 3/04883

FOREIGN PATENT DOCUMENTS

| CN | 203287814 U | 11/2013 |
|---|---|---|
| CN | 204029271 U | 12/2014 |
| CN | 206162450 U | 5/2017 |
| CN | 207181878 U | 4/2018 |
| CN | 207319187 U | 5/2018 |
| CN | 208126266 U | 11/2018 |

\* cited by examiner

*Primary Examiner* — Deeprose Subedi
(74) *Attorney, Agent, or Firm* — Rimon PC

(57) ABSTRACT

Embodiments of the present application provide a display device, which solves the problems that it is difficult for the single-screen display to be realized non-integrated touch and display, that the separation operation cannot be realized so that today's increasingly diverse application requirements cannot be satisfied. The display device according to the present application includes: a display screen; at least one touch screen communicatively coupled to the display screen; and a controller configured to execute the following instructions: adjusting a display content of the display screen in communication with the touch screen according to an input instruction of the touch screen.

13 Claims, 4 Drawing Sheets

DISPLAY DEVICE

CROSS-REFERENCE TO RELATED APPLICATIONS

This application is a Continuation-In-Part Application of PCT application No. PCT/CN2019/071585, filed on Jan. 14, 2019 which claims priority to CN Patent Application No. 201820768028.3, filed on May 21, 2018. All of the aforementioned applications are hereby incorporated by reference in their entireties.

TECHNICAL FIELD

Embodiments of the present relates to the field of display technologies, and more particularly to a display device.

BACKGROUND

As the application field of the display industry continues to expand, it is difficult for the single-screen display to be met today's increasingly diverse application requirements. Multi-screen display is used in some common scenarios, such as subways and airports, and the multi-screen display is needed much more to input information in scenarios that two pieces of information are needed to be confirmed at the same time. Application requirements such as extremely high definition and easy to view display experience, switching among multi-mode display, synchronous display without delaying and so on put forward higher demands on the display products.

SUMMARY

In view of this, embodiments of the present application provide a display device, which solves the problem that it is difficult for the single-screen display to be realized non-integrated touch and display, and that the separation operation cannot be realized, so that the requirements of today's increasingly diverse application are not be satisfied.

An embodiment of the present application provides a display device which includes:

a display screen;

at least one touch screen having a communication connection with the display screen; and a controller, configured to execute following instructions: according to an input instruction from the touch screen, adjusting a display content of the display screen having a communication connection with the touch screen.

In an embodiment of the present application, the display screen has one or both of a touch-control function and a display function.

In an embodiment of the present application, the touch screen has one or both of a touch-control function and a display function.

In an embodiment of the present application, the touch screen is a transparent structure.

In an embodiment of the present application, a shape of the display screen is a curved surface or a flat, and a shape of the touch screen is a curved surface or a flat.

In an embodiment of the present application, the display device further includes at least two curved surfaces, the display screen is disposed on at least one of the at least two curved surfaces; and, the touch screen is disposed on at least one of the at least two curved surfaces.

In an embodiment of the present application, the at least two curved surfaces display separately or simultaneously.

In an embodiment of the present application, when the at least two curved surfaces display simultaneously, picture information displayed by the at least two curved surfaces is same or different.

In an embodiment of the present application, the display screen is a flexible display screen.

In an embodiment of the present application, the at least two curved surfaces includes a display screen subassembly and a touch screen subassembly;

a shape of the display screen subassembly is a concave curved shape, a shape of the touch screen subassembly is a convex curved shape.

In an embodiment of the present application, the display device further includes:

a bottom cover;

a first support subassembly, disposed on the bottom cover. The display screen subassembly is disposed on a side, away from the bottom cover, of the first support subassembly, and the display screen subassembly corresponds to the first support subassembly. A radian of the first support subassembly is same as a radian of the display screen subassembly;

a first frame, disposed on a side, away from the first support subassembly, of the display screen subassembly and corresponding to the display screen subassembly. A radian of the first frame is same as the radian of the display screen subassembly;

a top cover, disposed on a side, away from the display screen subassembly, of the first frame and corresponding to the first frame. A radian of the top cover is same as the radian of the display screen subassembly;

a second support subassembly, disposed on a side, away from the first frame, of the top cover. The touch screen subassembly is disposed on a side, away from the top cover, of the second support subassembly and corresponding to the second support subassembly. A radian of the second support subassembly is same as a radian of the touch screen subassembly. And, a second frame, disposed on a side, away from the second support subassembly, of the touch screen subassembly and corresponding the touch screen subassembly. A radian of the second frame is same as the radian of the touch screen subassembly In an embodiment of the present application, the top cover includes a hollowed-out area and a non-hollowed area, wherein a projection of the display screen subassembly on the top cover corresponds to the hollowed-out area, and a projection of the touch screen subassembly on the top cover corresponds to the non-hollowed area.

In an embodiment of the present application, the first support subassembly and the bottom cover are fixed by a first screw;

the first frame and the top cover are fixed by a second screw; and the second frame and the top cover are fixed by a third screw.

In an embodiment of the present application, the display screen subassembly fits the first support subassembly;

the first support subassembly fits the top cover;

the touch screen subassembly fits the second support subassembly; and the second frame fits the second support subassembly.

In an embodiment of the present application, the display device further includes:

a printed circuit board, disposed between the bottom cover and the first support subassembly.

In an embodiment of the present application, the printed circuit board and the first support subassembly are fixed by a forth screw.

The display device according to the embodiments of the application includes at least one display screen, and the display has a communication connection with a touch screen. The display device also includes a controller, which is configured to adjust a display content of the display screen having a communication connection with the touch screen according to an input instruction from the touch screen. The problems that it is difficult for the single-screen display to be met today's increasingly diverse application requirements can be solved, the non-integrated touch and display capabilities and the separation operation can be achieved, the product can be used more convenient and practical, and users' requirements can be satisfied.

DETAILED DESCRIPTION

A clear and complete description of the technical means of the present application will be further described in detail below with reference to the accompanying drawings. Obviously, the described embodiments are only a part of the embodiments of the present application, and not all of the embodiments of the present application. Based on the embodiments in the present application, all other embodiments, obtained by those skilled in the art without creative efforts, are within the scope of the present application.

Figure 1:
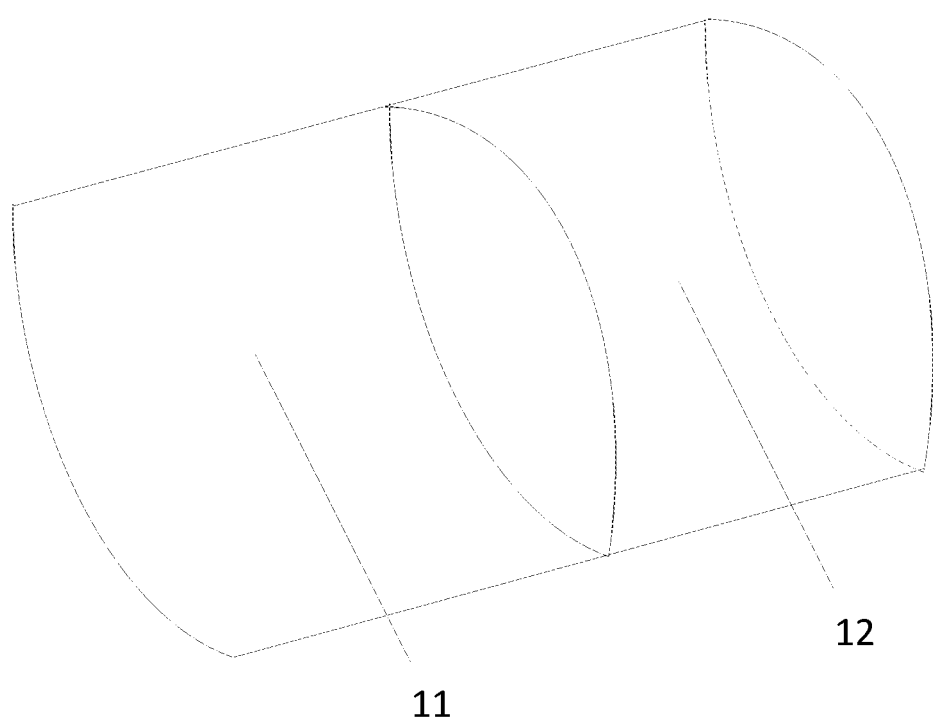
FIG. 1 is a schematic structural diagram of a display device according to an embodiment of the present application.

FIG. 1 is a schematic structural diagram of a display device according to an embodiment of the present application.

As shown in FIG. 1, the display device includes at least one display screen 11 and at least one touch screen 12, and the display screen 11 has a communication connection with the touch screen 12. The display device also includes a controller, and the controller is configured to adjust a display content of the display screen 11 having a communication connection with the touch screen 12 according to an input instruction from the touch screen. For example, when a user operates the touch screen 12, the touch screen 12 sends an instruction of the operation to the display screen 11 having a communication connection with the touch screen 12, after the controller analyzes the instruction, the display content of the display screen 11 is adjusted. In this way, the user can remotely manipulate the display screen 11 by means of the touch screen 12. The problems that it is difficult for the single-screen display to be met today's increasingly diverse application requirements can be solved, the non-integrated touch and display capabilities and the separation operation can be achieved, the product can be used more convenient and practical, and users' requirements can be satisfied.

It should be understood that the number of the display screen 11 may be one or more, the detailed number of the display screen 11 is not limited in the present application.

It also should be understood that, the number of the touch screen 12 may be one or more, the detailed number of the touch screen 12 is not limited in the present application.

In an embodiment of the present application, the display screen 11 may have a touch-control function, and the touch screen 12 may have a display function. In other words, the display screen 11 and the touch screen 12 can be used interchangeably. In this way, the operation is more flexible and convenient.

It should be understood that a shape of the display screen 11 is a curved surface or a flat, and a shape of the touch screen 12 is a curved surface or a flat. The detailed shape of the display screen and the touch screen are not limited in the present application.

It also should be understood that, the display screen 11 and the touch screen 12 may be flexible or non-flexible. The type of the display screen 11 and the touch screen 12 is not limited in the present application.

In an embodiment of the present application, the touch screen may be a transparent touch screen, that is, the touch screen may be a transparent structure and has a touch function. Each of the points, used for touch, on the transparent touch screen is corresponding to a "function switch", when a finger touches the "function switch", the corresponding "function program" will start immediately and executes a preset series of preset instructions. The transparent touch screen can be transparent like glass, so the transparency, the color richness of dynamic pictures and detail display of dynamic pictures can meanwhile be ensured. Therefore, the transparent touch screen allows users to view the components behind the transparent touch screen by means of the transparent touch screen, and allows users to interact with the dynamic information by means of the transparent touch screen. It is easy for the transparent touch screen to view and operate, and the style of the transparent touch screen is neoteric, the special preferences of some users can be demand, and experience of users can be improved.

It should be understood that, the structure of the touch screen may be a transparent structure or a translucent structure or an opaque structure, whether the touch screen is transparent is not limit in the present application.

In an embodiment of the present application, the display device includes at least two curved surfaces, and the at least two curved surfaces are connectable. The Curved surfaces may be presented as different curved surfaces. The display screen 11 is disposed on at least one of the at least two curved surfaces, the touch screen 12 is disposed on at least one of the at least two curved surfaces. At least one of the at least two curved surfaces has a display function, and at least one of the at least two curved surfaces has a touch-control function, that is to say, the display device can simultaneously implement display and touch-control functions. By means that the display device is disposed to a structure including at least two curved surfaces, the at least two curved surfaces are flexible and curved, the problems that it is difficult for the single-screen display to be met today's increasingly diverse application requirements can be solved.

It should be understood that, the different curved surfaces may display individually or simultaneously, whether the at least two curved surfaces display simultaneously is not limit in the present application.

It also should be understood that, at least two curved surfaces may display the same picture information or display different image information when displaying simultaneously, the content of the screen information of the at least two curved surfaces when simultaneously displaying are not limited in the present application.

It also should be understood that, the curved shape of a curved surface may be a fixed shape, or a shape of the display screen may be changed manually. For example, a shape of the display may be a curved surface or a flat or other shape, the detailed shape of the curved surface is not limited in the present application.

In an embodiment of the present application, the at least two curved surfaces of the display device are disposed side by side, so that the display area is enlarged and multi-screen display can be achieved. In this case, users can view the different display information at the same time without switching display screen back and forth, or the users' purpose of viewing and touch-controlling simultaneously can be satisfied.

It should be understood that, at least two curved surfaces may be arranged in a column, or may be arranged in a row, or may be arranged in a plurality of rows and columns, the arrangement of the at least two curved surfaces is not limit in the present application.

In an embodiment of the present application, the at least two curved surfaces include a display screen subassembly 2 and a touch screen subassembly 3; a shape of the display screen subassembly 2 is a concave curved shape, a shape of the touch screen subassembly 3 is a convex curved shape. It is convenient for the display screen subassembly 2 to be view, in which the display screen subassembly 2 is designed to a concave curved shape, it is easy for the touch screen subassembly 3 to be touched, in which the touch screen subassembly 3 designed to a convex curved shape, and the users' requirements for displaying and operating angles can be met by means that the display screen is designed as different shapes.

It should be understood that, a shape of the display screen subassembly 2 may be a concave curved shape, a flat, a convex curved shape or the like, and a shape of the touch screen subassembly 3 may be a convex curved shape, a flat, a concave curved shape or the like. The shape of the display screen subassembly 2 and the shape of the touch screen subassembly 3 are not limited in this present application.

Figure 2:
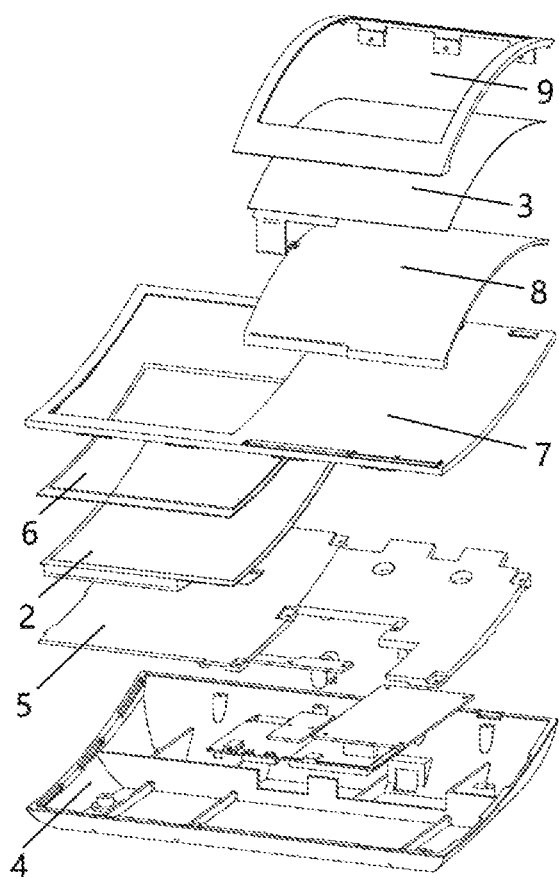
FIG. 2 is a schematic structural diagram of a display device according to another embodiment of the present application.
Figure 3:
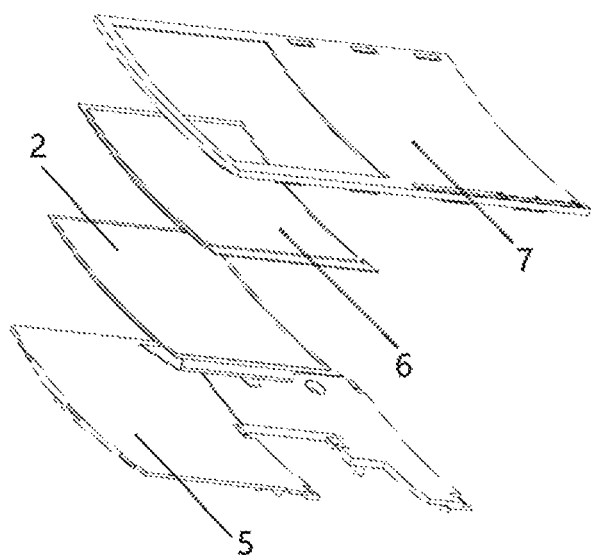
FIG. 3 is a schematic structural diagram of a display screen according to an embodiment of the present application.
Figure 4:
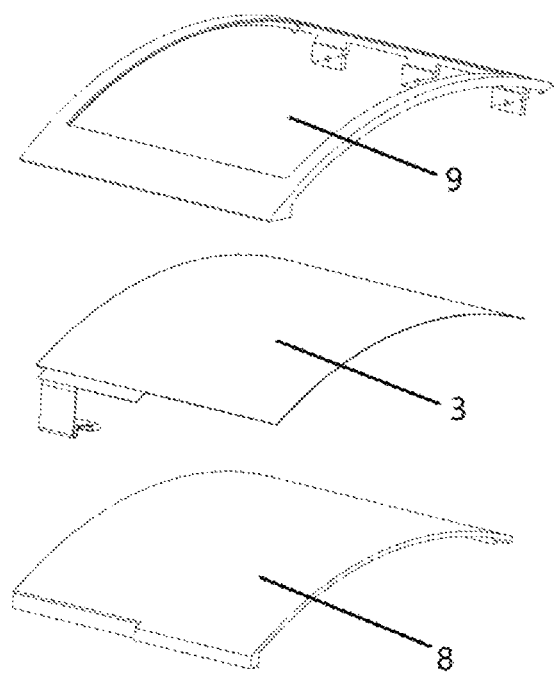
FIG. 4 is a schematic structural diagram of a touchscreen according to an embodiment of the present application.

FIG. 2 is a schematic structural diagram of a display device according to an embodiment of the present application. FIG. 3 is a schematic structural diagram of a display screen according to an embodiment of the present application. FIG. 4 is a schematic structural diagram of a touch screen according to an embodiment of the present application.

As shown in FIG. 2, FIG. 3 and FIG. 4, the display device further includes a bottom cover 4, a first support subassembly 5, a first frame 6, a top cover 7, a second support subassembly 8 and a second frame 9.

The first support subassembly 5 is configured to support the display screen subassembly 2, the first support subassembly 5 is disposed on the bottom cover 4, the display screen subassembly 2 is disposed on a side, away from the bottom cover 4, of the first support subassembly 5, a position of the display screen subassembly 2 corresponds to a position of the first support subassembly 5. Since a shape of the display screen subassembly 2 is a concave curved shape, the display screen subassembly 2 is made of an arc; since the first support subassembly 5 is configured to support the display screen subassembly 2, a radian of the first support subassembly 5 may be the same as a radian of the display screen subassembly 2.

The first frame 6 is configured to protect and fix the display screen subassembly 2, which can prevent positional shifting of the display screen subassembly 2.

The top cover 7 is configured to fix the display screen subassembly 2 and the touch screen subassembly 3 and connect them together, the top cover 7 is disposed on a side, away from the display screen subassembly 2, of the first frame 6, a radian of the top cover 7 may be the same as the radian of the display screen subassembly 2.

The second support subassembly 8 is configured to support the touch screen subassembly 3, and the second support subassembly 8 is disposed on a side, away from the first frame 6, of the top cover 7. The touch screen subassembly 3 is disposed on a side, away from the top cover 7, of the second support subassembly 8. A position of the second support subassembly 8 corresponds to a position of the touch screen subassembly 3, and since a shape of the touch screen subassembly 3 is a convex curved shape, the touch screen subassembly 3 is made of an arc. Since the second support subassembly 8 is configured to support the touch screen subassembly 3, a radian of the second support subassembly 8 may be the same as a radian of the touch screen subassembly 3.

The second frame 9 is configured to protect and fix the touch screen subassembly 3, which can prevent positional shifting of the display screen subassembly 2. The second frame 9 is disposed on a side, away from the second support subassembly 8, of the touch screen subassembly 3, a position of the second frame 9 corresponds to the position of the touch screen subassembly 3, and a radian of the second frame 9 is the same as the radian of the touch screen subassembly 3. A display device obtained by combining the on structure has two curved surfaces arranged side by side, which solves the problem that it is difficult for the single-screen display to be met today's increasingly diverse application requirements.

It should be understood that, the radian of the display screen subassembly and the radian of the touch screen subassembly may be same or different, and the radian of the display screen subassembly and the radian of the touch screen subassembly are any achievable radian. The radian of the display screen subassembly and the radian of the touch screen subassembly are not limit in the present application.

In an embodiment of the present application, the top cover 7 includes a hollowed-out area and a non-hollowed area, a projection of the display screen subassembly 2 on the top cover 7 corresponds to the hollowed-out area, and a projection of the touch screen subassembly 3 on the top cover 7 corresponds to the non-hollowed area. Since the display screen subassembly 2 is disposed on the side, away from the top cover 7, of the first frame 6, the purpose of operating the display screen subassembly 2 by means of the hollowed-out area and the first frame 6 can be achieved.

It should be understood that, a shape of the hollowed-out area may be a circle or a rectangle and so on, and the detailed shape of the hollowed-out area is not limited in the present application.

In an embodiment of the present application, the first support subassembly 5 and the bottom cover 4 are fixed by a first screw, the first frame 6 and the top cover 7 are fixed by a second screw, and the second frame 9 and the top cover 7 are fixed by a third screw. By the connection method on, the first support subassembly 5 being fixed to the bottom cover 4, and the first frame 6 and the second frame 9 being fixed to the top cover 7 can prevent the position shifting of the first support subassembly 5, the first frame 6 and the second frame 9. Since the second support subassembly 8 and the touch screen subassembly 3 are clamped between the second frame 9 and the top cover 7, by means that the second frame 9 is fixed to the top cover 7 by a third screw, the second support subassembly 8 and the touch screen subassembly 3 can be restricted between the second frame 9 and the top cover 7, thus the touch screen is fixed.

It should be understood that, the first support subassembly 5 and the bottom cover 4 are fixed by a first screw, the first frame 6 and the top cover 7 are fixed by a second screw, and the second frame 9 and the top cover 7 are fixed by a third screw. In addition to the screws used to achieve fixed connection, snaps or the like are also may be used to achieve fixed connection. The manner of fixed connection between the first support subassembly 5 and the bottom cover 4, the first frame 6 and the top cover 7, and the second frame 9 and the top cover 7 are not limited in the present application.

In an embodiment of the present application, the display screen subassembly 2 fits the first support subassembly 5, the first support subassembly 5 fits the top cover 7, the touch screen subassembly 3 fits the second support subassembly 8, and the second frame 9 fits the second support subassembly 8.

By the on fitting method, the display screen subassembly 2 fits the first support subassembly 5 and the bottom cover 4 and the first frame 6 and the top cover 7 which are already fixed connection in the on embodiments, so that the display screen subassembly 2 is assembled completely.

The touch screen subassembly 3 fits the second support subassembly 8 and the second frame 9 fits the second support subassembly 8, which functions to fix the touch screen subassembly 3 and the second support subassembly 8 to prevent positional shifting of the touch screen subassembly 3 and the second support subassembly 8 during the usage or movement. By the on manner, the display device is completely assembled, and the multi-screen display is realized, and the requirements of the customer are satisfied.

It should be understood that, the display screen subassembly 2 fits the first support subassembly 5, the first support subassembly 5 fits the top cover 7, the touch screen subassembly 3 fits the second support subassembly 8, and the second frame 9 fits the second support subassembly 8. In addition to the fitting method, other fixing methods may be used, such as electrostatic adsorption, adhesion and so on. The fixing manners between the display screen subassembly 2 and the first support subassembly 5, between the first support subassembly 5 and the top cover 7, between the touch screen subassembly 3 and the second support subassembly 8, and between the second frame 9 and the second support subassembly 8 are not limited in the present application.

In an embodiment of the present application, a curved radian of the top cover 7 is the same as a curved radian of the display screen subassembly 2. The top cover 7 includes a hollowed-out area and a non-hollowed area, the hollowed-out area corresponds to the display screen component 2, and the non-hollow area corresponds to the touch screen component 3. For example, a shape of the display screen subassembly 2 is a concave curved shape, a shape of the touch screen subassembly is a convex curved shape, since the curved radian of the top cover 7 is the same as the curved radian of the display screen subassembly 2, after the subassembly is completed, the top cover 7 can protect the components between the top cover 7 and the bottom cover 4, and there is a gap between the touch screen subassembly 3 and the top cover 7, the specific requirements of users can be satisfied.

It should be understood that, the detailed shape and radian of the top cover 7 are not limited in the present application.

Figure 5:
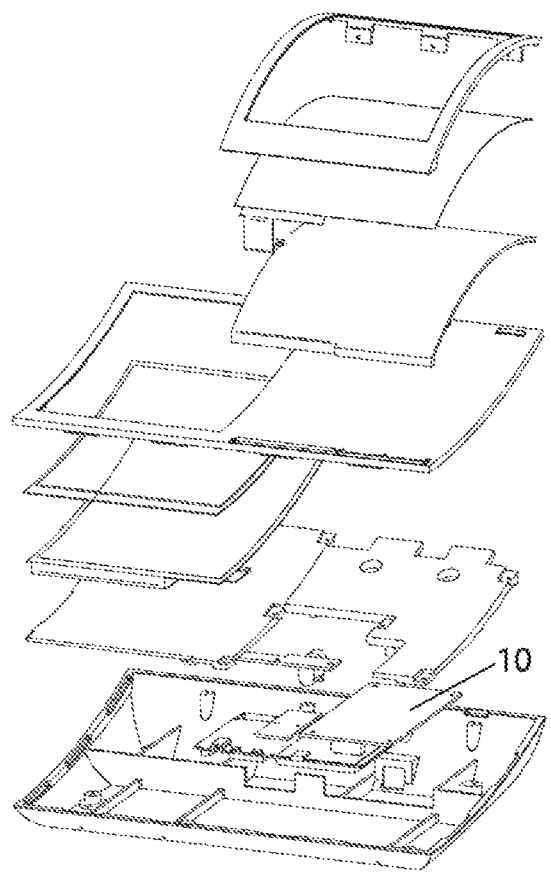
FIG. 5 is a schematic structural diagram of a display device according to another embodiment of the present application.

FIG. 5 is a schematic structural diagram of a display device according to an embodiment of the present application.

As shown in FIG. 5, the display device also includes a printed circuit board 10. The printed circuit board 10 is disposed between the bottom cover 4 and the first support subassembly 5, the bottom cover 4 may has a groove, and the printed circuit board 10 may be fixed in the groove of the bottom cover 4. The printed circuit board 10 functions as a supporting carrier of the electronic component, and realizes the electrical connection between electronic components, and then the purpose of controlling the display device is achieved.

For example, a virtual keyboard or the like may be implemented on both the display screen subassembly 2 and the touch screen subassembly 3 via the printed circuit board 10. Since the display device on includes the display screen subassembly 2 and the touch screen subassembly 3, adopt a more advanced flexible screen, and then makes the structure of the product more concise and compact. Combined with the advanced electronic technology, the on display device exhibits a curved or a flat display effect, and will be more convenient and practical by combination with the interactive touch technology and the extended use of the screen.

It should be understood that, the printed circuit board 10 may be fixed to the bottom cover 4 or may be fixed to the first support subassembly 5, and the fixed position of the printed circuit board 10 is not limited in the present application.

In one embodiment of the present application, the printed circuit board 10 is fixed to the first support subassembly 5 with a forth screw, the fixing method by adopting screws is relatively firm, the problems such as looseness or falling off of the printed circuit board 10 during the usage or movement can be prevented, and thus the normal use of the display device may be ensured.

It should be understood that, the printed circuit board 10 and the first support subassembly 5 may be fixed by a forth screw, the printed circuit board 10 can also be fixed by other fixing means. The fixing manner of the printed circuit board 10 is not limited in the present application.

The on are only the preferred embodiments of the present application and are not configured to limit the scope of the present application. Any modifications, equivalent substitutions, improvements and so on made within the spirit and principle of the present application should be included within the scope of the present application.

What is claimed is:

1. A display device, comprising:
   a display screen;
   at least one touch screen having a communication connection with the display screen;
   at least two curved surfaces, wherein the display screen is disposed on at least one of the at least two curved surfaces; the touch screen is disposed on at least one of the at least two curved surfaces;
   and
   a controller executing following instructions: according to an input instruction from the touch screen, adjusting a display content of the display screen having a communication connection with the touch screen;
wherein the at least one touch screen is external to the display screen, and the display device allows a user to remotely manipulate the display screen by means of the at least one touch screen;
wherein the at least two curved surfaces comprise a display screen subassembly and a touch screen subassembly: and
wherein a shape of the display screen subassembly is a concave curved shape, a shape of the touch screen subassembly is a convex curved shape.

2. The display device according to claim 1, wherein the display screen has one or both of a touch-control function and a display function.

3. The display device according to claim 1, wherein the touch screen has one or both of a. touch-control function and a display function.

4. The display device according to claim 1, wherein the touch screen is a transparent structure.

5. The display device according to claim 1, wherein a shape of the display screen is a curved surface or a flat, and a shape of the touch screen is a curved surface or a flat.

6. The display device according to claim 1, wherein the at least two curved surfaces display separately or simultaneously.

7. The display device according to claim 6, wherein when the at least two curved surfaces display simultaneously, picture information displayed by the at least two curved surfaces is same or different.

8. The display device according to claim 1, wherein the display screen is a flexible display screen.

9. The display device according to claim 1, further comprising: a first support subassembly, a bottom cover, a first frame, a top cover, a second support subassembly and a second frame: wherein
the first support subassembly and the bottom cover are fixed by a first screw;
the first frame and the top cover are fixed by a second screw; and
the second frame and the top cover are fixed by a third screw.

10. The display device according to claim 9, wherein the top cover comprises a hollowed-out area and a non-hollowed area, a projection of the display screen subassembly on the top cover corresponds to the hollowed-out area, and a projection of the touch screen subassembly on the top cover corresponds to the non-hollowed area.

11. The display device according to claim 9, wherein the display screen subassembly fits the first support subassembly;
the first support subassembly fits the top cover;
the touch screen subassembly fits the second support subassembly; and
the second frame fits the second support subassembly.

12. The display device according to claim 9, further comprising a printed circuit board, disposed between the bottom cover and the first support sub assembly.

13. The display device according to claim 12, wherein the printed circuit board and the first support subassembly are fixed by a fourth screw.

* * * * *